(12) United States Patent
Sulpizio, Jr.

(10) Patent No.: US 12,375,301 B2
(45) Date of Patent: *Jul. 29, 2025

(54) TEMPORAL KEY GENERATION AND PKI GATEWAY

(71) Applicant: Ronald Francis Sulpizio, Jr., Clifton, VA (US)

(72) Inventor: Ronald Francis Sulpizio, Jr., Clifton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/445,607

(22) Filed: Nov. 17, 2023

(65) Prior Publication Data

US 2024/0089123 A1    Mar. 14, 2024

Related U.S. Application Data

(60) Continuation of application No. 17/142,473, filed on Jan. 6, 2021, now Pat. No. 11,831,787, which is a continuation of application No. 16/273,210, filed on Feb. 12, 2019, now Pat. No. 10,892,902, which is a division of application No. 15/145,785, filed on May 3, 2016, now Pat. No. 10,205,598.

(60) Provisional application No. 62/156,580, filed on May 4, 2015, provisional application No. 62/156,312, filed on May 3, 2015.

(51) Int. Cl.
*H04L 9/40* (2022.01)
*H04L 9/00* (2022.01)
*H04L 9/30* (2006.01)
*H04L 9/32* (2006.01)

(52) U.S. Cl.
CPC .......... *H04L 9/3268* (2013.01); *H04L 9/006* (2013.01); *H04L 9/302* (2013.01); *H04L 9/3033* (2013.01); *H04L 9/3247* (2013.01); *H04L 63/0272* (2013.01); *H04L 63/0281* (2013.01)

(58) Field of Classification Search
CPC ....... H04L 9/3268; H04L 9/006; H04L 9/302; H04L 9/3033; H04L 9/3247; H04L 63/0272; H04L 63/0281; H04L 9/321
See application file for complete search history.

(56) References Cited

U.S. PATENT DOCUMENTS

| | | | | |
|---|---|---|---|---|
| 6,195,433 B1* | 2/2001 | Vanstone | ............... | H04L 9/3066 380/46 |
| 8,285,996 B2* | 10/2012 | McCullagh | ........... | H04L 9/3247 713/180 |
| 9,450,950 B2* | 9/2016 | Pahl | ..................... | H04L 63/0869 |
| 2005/0084100 A1* | 4/2005 | Spies | ..................... | H04L 9/0847 380/30 |
| 2006/0153364 A1* | 7/2006 | Beeson | ................. | H04L 9/3252 380/30 |
| 2006/0153365 A1* | 7/2006 | Beeson | ................. | H04L 9/3066 380/30 |
| 2006/0153366 A1* | 7/2006 | Beeson | ................. | H04L 9/3066 380/30 |

(Continued)

*Primary Examiner* — David Garcia Cervetti

(57) ABSTRACT

Temporal key generation devices and methods are described. One such device of a first domain receives a "seed" to generate a private key associated with a public key for use in a second domain. The device uses the private key in cryptographic operations with the second domain. When the device loses power or is no longer connected to the second domain, the private key may be erased or no longer stored on the device.

21 Claims, 10 Drawing Sheets

(56) References Cited

U.S. PATENT DOCUMENTS

| | | | |
|---|---|---|---|
| 2006/0153367 A1* | 7/2006 | Beeson | H04L 9/3252 380/30 |
| 2006/0153368 A1* | 7/2006 | Beeson | H04L 9/3252 380/30 |
| 2006/0198517 A1* | 9/2006 | Cameron | H04L 9/3218 380/44 |
| 2006/0274899 A1* | 12/2006 | Zhu | H04L 63/02 380/281 |
| 2007/0130069 A1* | 6/2007 | Kay | H04L 51/48 705/50 |
| 2009/0209232 A1* | 8/2009 | Cha | H04L 63/06 455/411 |
| 2009/0240941 A1* | 9/2009 | Lee | H04L 12/66 713/169 |
| 2010/0031036 A1* | 2/2010 | Chauncey | H04W 12/033 713/168 |
| 2011/0255696 A1* | 10/2011 | Ma | H04L 9/083 380/279 |
| 2011/0296172 A1* | 12/2011 | Fu | H04L 9/0825 713/156 |
| 2012/0087494 A1* | 4/2012 | Spalka | H04L 9/3066 380/46 |
| 2012/0331287 A1* | 12/2012 | Bowman | H04L 9/0844 713/155 |
| 2013/0322621 A1* | 12/2013 | Yoon | H04L 9/0816 380/44 |
| 2014/0098960 A1* | 4/2014 | Xu | H04L 9/0819 380/278 |
| 2014/0140507 A1* | 5/2014 | Park | H04W 8/183 380/247 |
| 2014/0208434 A1* | 7/2014 | Brouwer | H04L 63/10 726/26 |
| 2014/0281540 A1* | 9/2014 | Brouwer | H04L 9/12 713/169 |
| 2015/0213433 A1* | 7/2015 | Khan | G06Q 20/3829 705/71 |
| 2015/0333906 A1* | 11/2015 | Rahman | H04L 9/3066 380/44 |
| 2016/0014114 A1* | 1/2016 | Pahl | H04L 9/3013 713/156 |
| 2016/0294809 A1* | 10/2016 | LeSaint | H04L 63/12 |
| 2016/0323107 A1* | 11/2016 | Bhogal | H04W 12/10 |
| 2016/0323108 A1* | 11/2016 | Bhogal | H04W 12/08 |
| 2016/0330025 A1* | 11/2016 | Gouget | H04L 9/00 |
| 2017/0150411 A1* | 5/2017 | Zhong | H04W 76/11 |
| 2017/0373844 A1* | 12/2017 | Sykora | H04L 9/006 |
| 2020/0280452 A1* | 9/2020 | Pahl | H04L 67/141 |

* cited by examiner

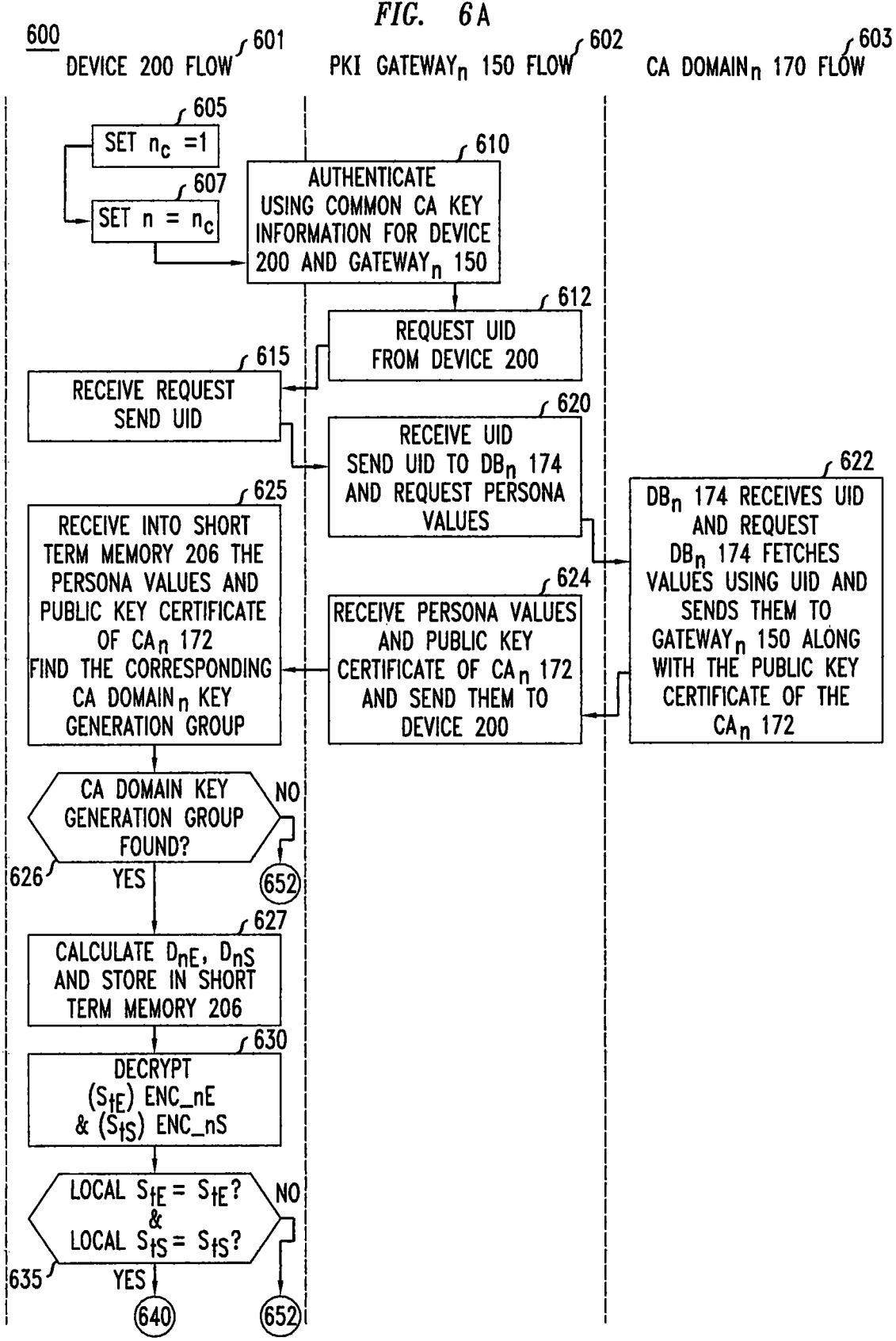

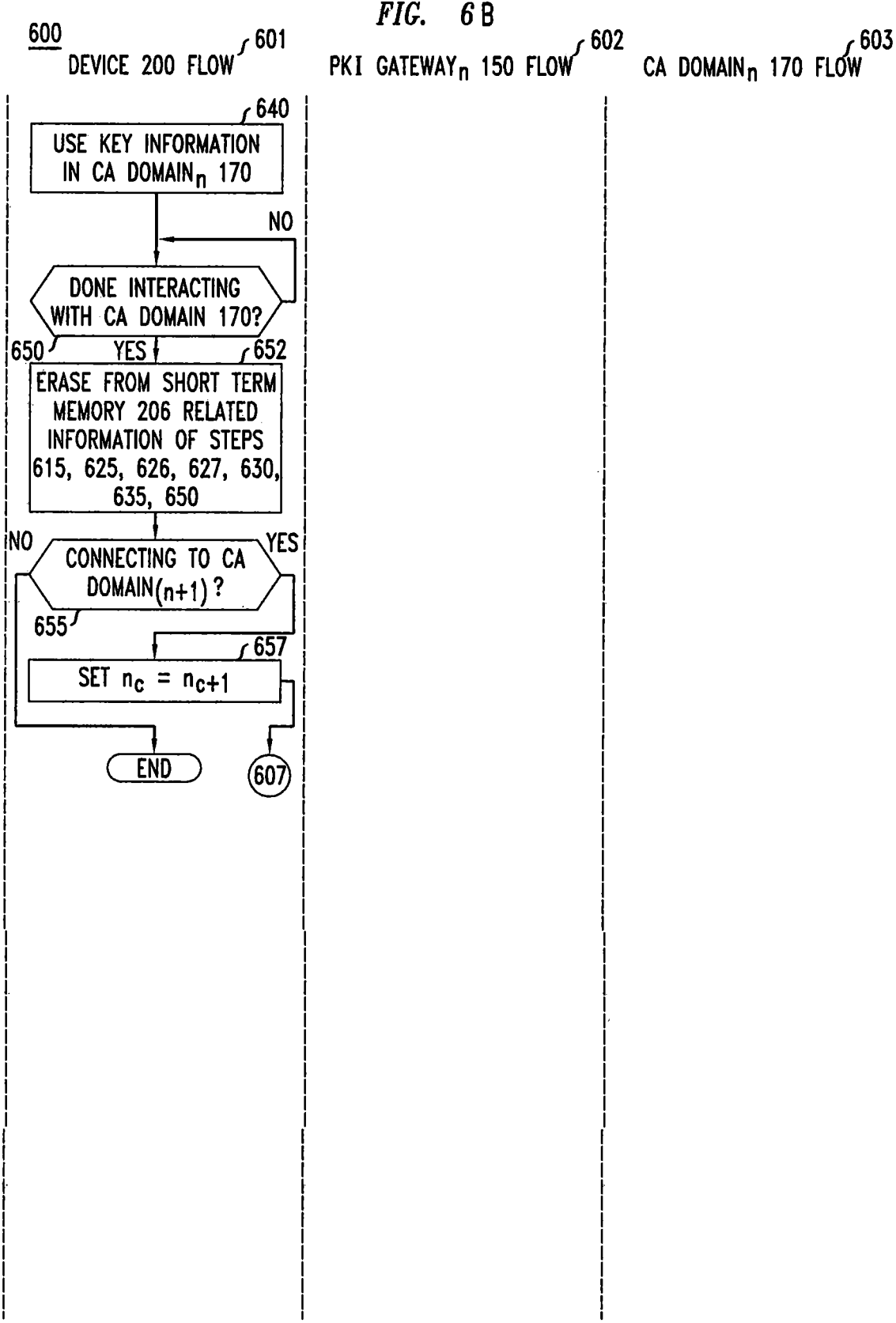

TEMPORAL KEY GENERATION AND PKI GATEWAY

RELATED APPLICATIONS

The present application is a continuation of U.S. patent application Ser. No. 17/142,473 filed Jan. 26, 2021 (the "'473 Application") which is a continuation of U.S. patent application Ser. No. 16/273,210 filed Feb. 12, 2019 (the "'210 Application"), which is a divisional of U.S. patent application Ser. No. 15/145,785 filed May 3, 2016 (the "'785 Application"). The present application claims priority to the '473, '210 and '785 Applications as well as to U.S. Provisional Patent Application No. 62/156,312 filed May 3, 2015 ("'312 application") and U.S. Provisional Patent Application No. 62/156,580 filed May 4, 2015 ("'580 Application"). The present application incorporates by reference herein the entire disclosures of the '473, '210, '785, '312 and '580 Applications as if set forth in full herein.

INTRODUCTION

Typical user tokens, for example Personal Identity Verification (PIV) cards and smart cards, often store cryptographic public and private key information on the token itself for use in public key protocols. The key information is often used by a user in digital signature, authentication and encryption interactions between the user and an entity such as a person, machine or organization. The key information stored on the token often includes information that associates the user with an entity with which the user interacts. This information persists on the token during and between the user's interactions with the entity. If a non-intended entity obtains the token, the non-intended entity might be able to determine with which entities the user is affiliated. Similarly, the long term storage of public and private key information in computers, portable devices like a smart phone and the cloud are subject to like compromise. This is a privacy concern particularly to those that do not want their associations known beyond a particular sphere of privacy. Moreover, once compromised, the keys of such public key protocols could be used for unintended purposes by non-intended entities without the consent or even knowledge of the user creating a cyber security concern.

Public key protocols are used in, for example, Diffie-Helman systems, Elliptic Curve systems and Rivest, Shamir, Adelman (RSA) systems. For illustrative purposes, the RSA scheme is described. RSA utilizes three major operations: key generation, encryption and decryption. For RSA, the following is typical notation:

N=a modulus for modular arithmetic=p×q
Φ(N)=the totient of N
Φ(p)=the totient of p
Φ(q)=the totient of q
e=an integer that is relatively prime to Φ(N)
p=a prime number with properties including e being coprime to Φ(p)
q=a prime number with properties including e being coprime to Φ(q)
d=an integer that is the multiplicative inverse of e modulo Φ(N), that is: $d=e^{-1} \mod \Phi(N)$
M is a message
C is the cyphertext of M
RSA encryption: $C=M^e \mod N$
RSA decryption: $M=C^d \mod N$
RSA public key: (e,N)
RSA private key: (d,N)

The RSA scheme capitalizes on the extreme difficulty of factoring a large composite number, N, into its constituent primes.

See U.S. Pat. Nos. 4,405,829, 8,442,219 and Lecture 12: Public-Key Cryptography and the RSA Algorithm Lecture Notes on "Computer and Network Security" by Avi Kak, Mar. 31, 2015 for examples describing the RSA scheme including key generation, encryption and decryption.

Multi-Prime RSA

A variant of RSA is Multi-Prime RSA. An example of this variant is detailed in U.S. Pat. No. 5,848,159. Multi Prime RSA suggests the use of more than two distinct prime factors (e.g., p, q and r) to generate the public modulus N, whereas traditional RSA uses only two distinct prime factors (e.g., p and q). The encryption and decryption processes of Multi-Prime RSA are similar to traditional RSA. However, in Multi-Prime RSA, the more than two distinct prime factors used to generate the modulus N are also used for decryption.

SUMMARY

The objective of the present invention is to address at least some of the problems outlined above. This objective and others are achieved primarily by providing a method and apparatus according to the attached independent claims.

According to an aspect of the invention, a key generating device comprising: an interface operable to: connect to a PKI gateway; receive from the PKI gateway information associated with a second domain including a second domain public key certificate signed by a second domain certification authority of the second domain and a seed value; and connect to the second domain; and a crypto processor operable to: authenticate with the PKI gateway, as function of a first domain public key signed by a first certification authority of a first domain; create information associated with the second domain including a second domain private key from the seed value, the second domain private key cryptographically related to a second domain public key; and cryptographically interact with the second domain in digital signature and decryption operations as a function of at least one of the second domain private key and the second domain public key certificate. The key generation device may further comprise: a memory operable to store the received and created information associated with the second domain and further operable to perform at least one of the following: erase at least the stored second domain public key certificate and the second domain private key when the device is disconnected from the second domain; and no longer store at least the stored second domain public key certificate and the second domain private key when the memory no longer receives power or is no longer sufficient to sustain storage of at least the stored second domain public key certificate and the second domain private key.

According to another embodiment of the invention, a first party device comprising: a value associated with a first domain; a random number generator that generates at least one first party number; an interface that connects to a second domain and that receives second domain information from a second party, the second domain information including at least one second domain number, the second party belonging to both the first domain and the second domain; a cryptographic key generator that generates second domain key pair information including a second domain private key, the second domain key pair information being a function of the at least one first party number and the at least one second domain number; and a memory that stores the second party information and the second domain key pair information, the second party information and the second domain key pair information being erased from the memory before or when the device is disconnected from the second domain.

In another embodiment of the invention, a first device comprising: a non-volatile memory that stores first domain cryptographic key information; a random number generator that generates at least one first party number; an interface that: connects, using the first domain cryptographic key information, to a second device associated with a certificate authority of a second domain; and receives a seed from the second device; and a cryptographic key generator that generates at least two second domain asymmetric keys using the at least one first party number and the seed.

In another embodiment of the invention, a first party device comprising: a random number generator that generates at least one first party number; an interface that: connects, using first domain cryptographic key information, to a second device associated with a second domain certification authority; and receives at least one second domain seed from the second device; and a cryptographic key generator that generates a second domain public key pair as a function of the at least one first party number and the at least one second domain seed. The first party device wherein further: the at least one first party number may be a plurality of first party prime numbers, each first party prime number totient may be coprime with a predetermined value; the at least one second domain seed may be an at least one second party prime number, each second party prime number totient may be coprime with the predetermined value; and the function may be multiplication. The first party, wherein further, the value may be at least one of a resident public key digitally signed by a third party and a first party unique identifier, the first party device may further be comprised of: an authenticator, that, prior to the receiving, authenticates with the second party using at least one of the resident public key and the first party unique identifier. The first party device, wherein, further, the interface may also send the second domain public key to the second device. The first party device, wherein further, the second domain information may also include the second domain public key digitally signed by the second party.

PKI Gateway Provisioning

In another embodiment of the invention, a PKI Gateway method, system, or computer readable medium includes instruction or a means to process the instructions, the instructions comprising: generating a random number; sending the random number to a second party; and receiving domain public key information from the second party, the domain public key information being generated by the second party using the random number and domain key generation information of the second party. The PKI Gateway method, system, or computer readable medium wherein further, the random number and the domain public key information may be generated as a function of a common value. The PKI Gateway method, system, or computer readable medium, wherein further, the common value may be e; and the domain public key information may include N and the common value. The instructions may further be comprised of: sending the public key information to a certification authority for signing; receiving the signed public key from the certification authority and sending the random number and the signed public key to a database for storage. The PKI Gateway method, system, or computer readable medium, wherein further: the receiving from the second party may also include an encrypted secret, the encrypted secret may also include a secret encrypted using the public key; and the sending to the database may include sending the encrypted secret. The PKI Gateway method, system, or computer readable medium, wherein further: the PKI Gateway may be a member of both a first domain and a second domain; the second party may be a member of the first domain; and the certification authority and database may be members of the second domain. The PKI Gateway method, system, or computer readable medium with instructions that may further be comprised of authenticating with the second party.

PKI Gateway Connecting

In another embodiment, a PKI Gateway method, system, or computer readable medium with instructions or means to process the instruction, the instructions comprising: receiving lookup information from a second party; retrieving from a database, using the lookup information, second party information, the second party information including a random number and at least one signed public key, the at least one signed public key generated using the random number; and sending, the second party information to the second party. The PKI Gateway method, system, or computer readable medium, wherein further, the second party information further may include an encrypted secret, the encrypted secret including a secret encrypted using the public key. The PKI Gateway method, system, or computer readable medium, wherein further: the PKI Gateway may be a member of both a first domain and a second domain; the second party may be a member of the first domain; and the database may be a member of the second domain. The PKI Gateway method, system, or computer readable medium with instructions that may further be comprised of authenticating with the second party.

Device Initialization

In another embodiment of the invention, a temporary key generation device method, system with a means to execute instructions, or computer readable medium with instructions, the instructions or method comprising: receiving configuration input; generating a base domain public and private key pair using the configuration input; generating domain key generation information using the configuration input; sending the base domain public key to a base certification authority for signing; receiving the base domain signed public key from the base certification authority; and storing the base domain private key, the base domain signed public key, and domain key generation information. The Temporary Key Generation Device method, system with a means to execute instructions, or computer readable medium with instructions, wherein further: the configuration input may include a base domain e used in generating the base domain public and private key; and the configuration input may include at least one domain e used in generating domain key generation information.

Device Provisioning

In another embodiment of the invention, a Temporary Key Generation Device method, system with a means to execute instructions, or computer readable medium with instructions, the instructions or method comprising: generating and storing domain key generation information; receiving a random number from a second party; generating domain public key information using the random number and the domain key generation information; and sending the domain public key information to the second party. The Temporary Key Generation Device method, system with a means to execute instructions, or computer readable medium with instructions, wherein further: the domain key generation information may include a secret and a common value; and the random number and the domain public key information may be generated as a function of the common value. The Temporary Key Generation Device method, system with a means to execute instructions, or computer readable medium with instructions, wherein further; the common value may be e; and the domain public key information may include N. The Temporary Key Generation Device method, system with a means to execute instructions, or computer readable medium with instructions, the instructions or method may further be comprised of: encrypting the secret using the domain public key information; sending the encrypted secret to the second party; erasing the random number, the domain public key information, and the encrypted secret when disconnected from the second party. The Temporary Key Generation Device method, system with a means to execute instructions, or computer readable medium with instructions, wherein further: the Temporary Key Generation Device may be a member of a first domain; and the second party may be a member of both the first domain and a second domain. The Temporary Key Generation Device method, system with a means to execute instructions, or computer readable medium with instructions, the instructions or method may further be comprised of authenticating with the second party.

Device Connecting

In another embodiment, a Temporary Key Generation Device method, system with a means to execute instructions, or computer readable medium with instructions, the instructions or method comprising: generating and storing domain key generation information; sending lookup information to a second party; receiving a random number associated with the lookup information from the second party; generating a domain private key from the random number and the domain key generation information; and storing the domain private key. The Temporary Key Generation Device method, system with a means to execute instructions, or computer readable medium with instructions, the instructions or method may further be comprised of: receiving from the second party at least one of a domain public key information and an encrypted secret also associated with the lookup information; verifying that the domain private key is valid by at least one of: Generating local domain public key information using the random number and the domain key generation information and checking whether the local domain public key information is the same as the received domain public key information; and decrypting the encrypted secret and checking whether the decrypted secret is the same as a local secret in the domain key generation information. The Temporary Key Generation Device method, system with a means to execute instructions, or computer readable medium with instructions, the instructions or method may further be comprised of erasing the random number, the domain private key, and the domain public key information from the Temporary Key Generation Device when disconnected from the second party. The Temporary Key Generation Device method, system with a means to execute instructions, or computer readable medium with instructions, wherein further: the Temporary Key Generation Device may be a member of a first domain; and the Second Party may be a member of the first domain and a second domain. The Temporary Key Generation Device method, system with a means to execute instructions, or computer readable medium with instructions, the instructions or method may further be comprised of Authenticating with the second party.

In another embodiment a user's token connects to a Domain B via strong authentication using public values registered in a Domain A. Once in Domain B, the user's token generates the same key pair as before using a key generator. This key pair exists on the token only while token is connected to Domain B. User performs cryptographic operations in Domain B utilizing user's Domain B key pair while token remains connected to Domain B. When the user disconnects from Domain B, User's token erases any residue from token that can be associated with Domain B.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIGS. 6A and 6B illustrate a flow diagram showing an example key generation according to an embodiment of the present invention;

DETAILED DESCRIPTION OF EMBODIMENTS

Figure 1:
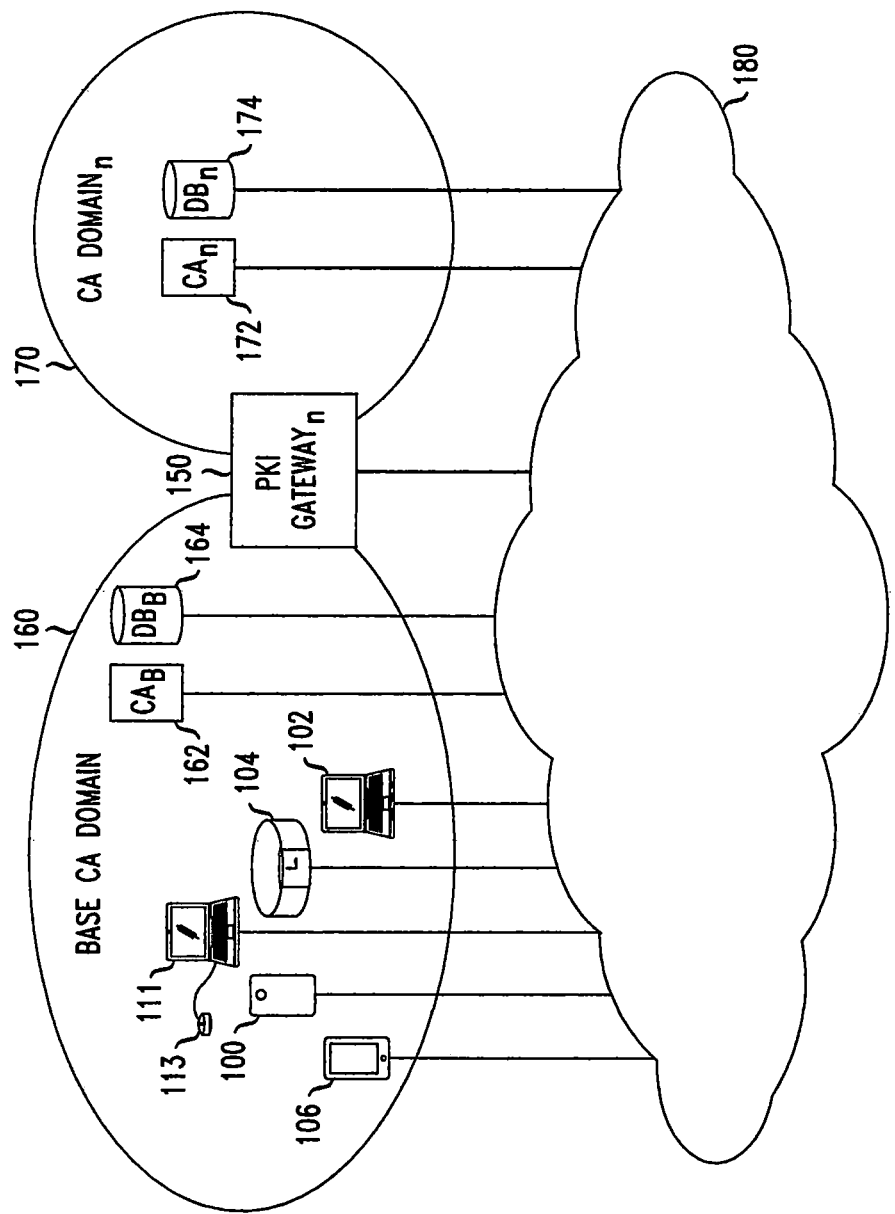
FIG. 1 illustrates an example network and logical diagram showing example elements and their relation according to the present invention.

Exemplary embodiments of methods and devices for generating temporal public and private cryptographic keys to preserve privacy are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise. It should be further understood that the terms "comprises", "comprising,", "includes" and/or "including", when used herein, specify the presence of stated features, systems, subsystems, steps, operations, elements, and/or components, but do not preclude the presence or addition of one or more other features, systems, subsystems, steps, operations, elements, components, and/or combinations thereof.

As used herein the terms "computer", "CPU", "hardware server" or "servers" means at least an electronic device that is specially configured to complete associated functions and features described herein. Such devices may be operable to execute stored, specialized instructions stored as electrical signals in an onboard memory, in separate memory, or in a specialized database for example to complete the associated functions and features described herein. Such instructions represent functions and features that have been integrated into memory as stored, electronic signals. Moreover, as used herein the terms "device" and "server" may also be embodied in virtual form on an e electronic device that is specially configured to complete associated functions and features described herein.

It should be understood that where used herein, the designations "first", "second", etc., are used to distinguish one component (e.g., app, device, subsystem, section, etc.) or part of a process from another and does not indicate an importance, priority or status. In fact, the component or parts of a process could be re-designated (i.e., re-numbered) and it would not affect the operation of systems or methods provided by the present invention.

It should be understood that when one part of a device or system is described or depicted as being connected to another part, other well-known components used to facilitate such a connection may not be described or depicted because such components are well known to those skilled in the art.

Yet further, when one part of a device or system is described or depicted as being connected to another part using "a connection" (or single line in a figure) it should be understood that practically speaking such a connection (line) may comprise (and many times will comprise) more than one physical connection or channel, may be omni-directional or bi-directional, and may or may not include separate data, formatting and signaling.

It should be noted that the systems and devices, as well as any subsystems, etc., thereof, illustrated in the figures are not drawn to scale, are not representative of an actual shape or size and are not representative of any actual system, platform or device layout, or manufacture's drawing. Rather, the systems and devices are drawn so as to help explain the features, functions and processes of exemplary embodiments of the present invention described herein.

As used herein, the term "embodiment" refers to an example of the present invention.

FIG. 1 illustrates an exemplary network and logical diagram showing exemplary elements and their relation according to one embodiment of the present invention. As shown, various elements are connected to network 180. Base CA Domain 160 is shown as a logical construct and may include a base certification authority ($CA_B$) 162 which may comprise one or more hardware servers configured as a certification authority; a base database ($DB_B$) 164; a PKI Gateway$_n$ 150 which may comprise one or more hardware servers configured as a gateway; a computer 111; a smart card reader 113; and several exemplary temporal key generating devices such as: a smart card 100, a computer 102, a smart watch 104, and a smart phone 106.

Also depicted in FIG. 1 is a CA Domain$_n$ 170 that may include an $n^{th}$ certification authority ($CA_n$) 172 for the CA Domain s 170 which may comprise one or more hardware servers configured as a certification authority, a database ($DB_n$) 174, and the PKI Gateways 150. While the configuration shown depicts two separate CA domains, another exemplary configuration combines CA Domain$_n$ (170) and its associated elements within Base CA Domain (160). Moreover, in one embodiment the databases 164, 174 may be X.500 databases.

Figure 2A:
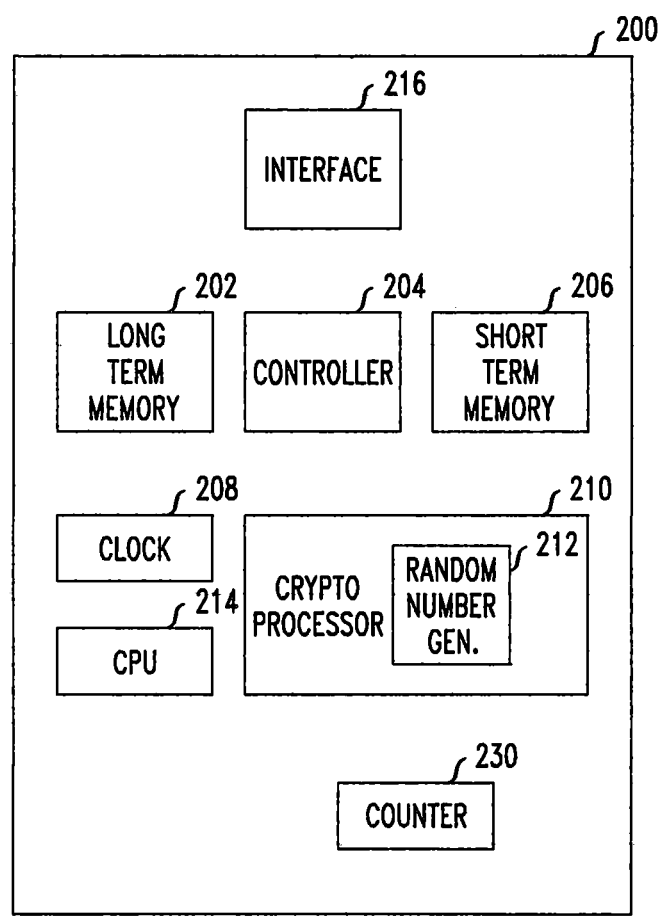
FIG. 2A illustrates a diagram of example elements of a device according to an embodiment of the present invention.

FIG. 2A illustrates a diagram of an exemplary temporal key generating device 200 according to an embodiment of the present invention. As shown, temporal key generating device 200 may comprise a smart card form factor, long term memory 202, a controller 204, a short term memory 206, a clock 208, a crypto processor 210, a random number generator 212, a central processing unit (CPU) 214, an interface 216, and a counter 230. While the device 200 is depicted as a smart card, it should be understood that alternative temporal key generating devices according to embodiments of the present invention may have different form factors. For example, the device 200 may comprise: a computer, a PIV card, smart card, RFID card, chip implant, smart watch, smart phone, laptop, or other portable electronic device or virtual device. While long term memory 202 and short term memory 206 are shown as two separate elements, it should be understood they can be implemented as one memory but the functionality of automatic erasure upon power loss might be limited. Moreover, short term memory 206 may be implemented as volatile memory such that it automatically erases once it loses power. Long term memory 202 may be implemented as non-volatile memory so that it does not erase if it loses power. Moreover, long term memory 202 may be implemented as a secure space with limited exposure of information, therein, beyond the limits of the long term memory 202 and processors 210 and 214. As part of the initialization of the device 200, the device 200 may be loaded with a device identification (ID) and instructions for executing the methods and related processes described herein. Moreover, much of the device 200 may be implemented in an integrated circuit and may be configured to be updateable or initialized using firmware.

Figure 2B:
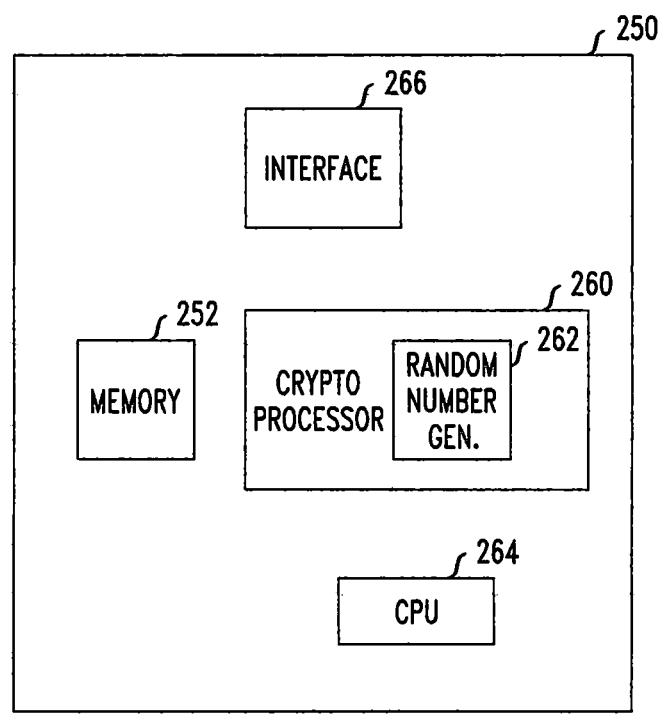
FIG. 2B illustrates a diagram of example elements of a PKI Gateway according to an embodiment of the present invention

FIG. 2B illustrates a diagram of an example PKI Gateway according to an embodiment of the present invention. As shown is an exemplary PKI Gateway 250 in a computer form factor (e.g., hardware servers), an interface 266, a memory 252, a cryptoprocessor 260, a random number generator 262 and a central processing unit (CPU) 264. The PKI Gateway 250 may also include instructions for executing the methods and related processes described herein. While the exemplary PKI Gateway 250 is described in a computer form factor, it should be understood that the PKI Gateway 250 may also be implemented in various forms, including virtual computing forms.

Figure 3:
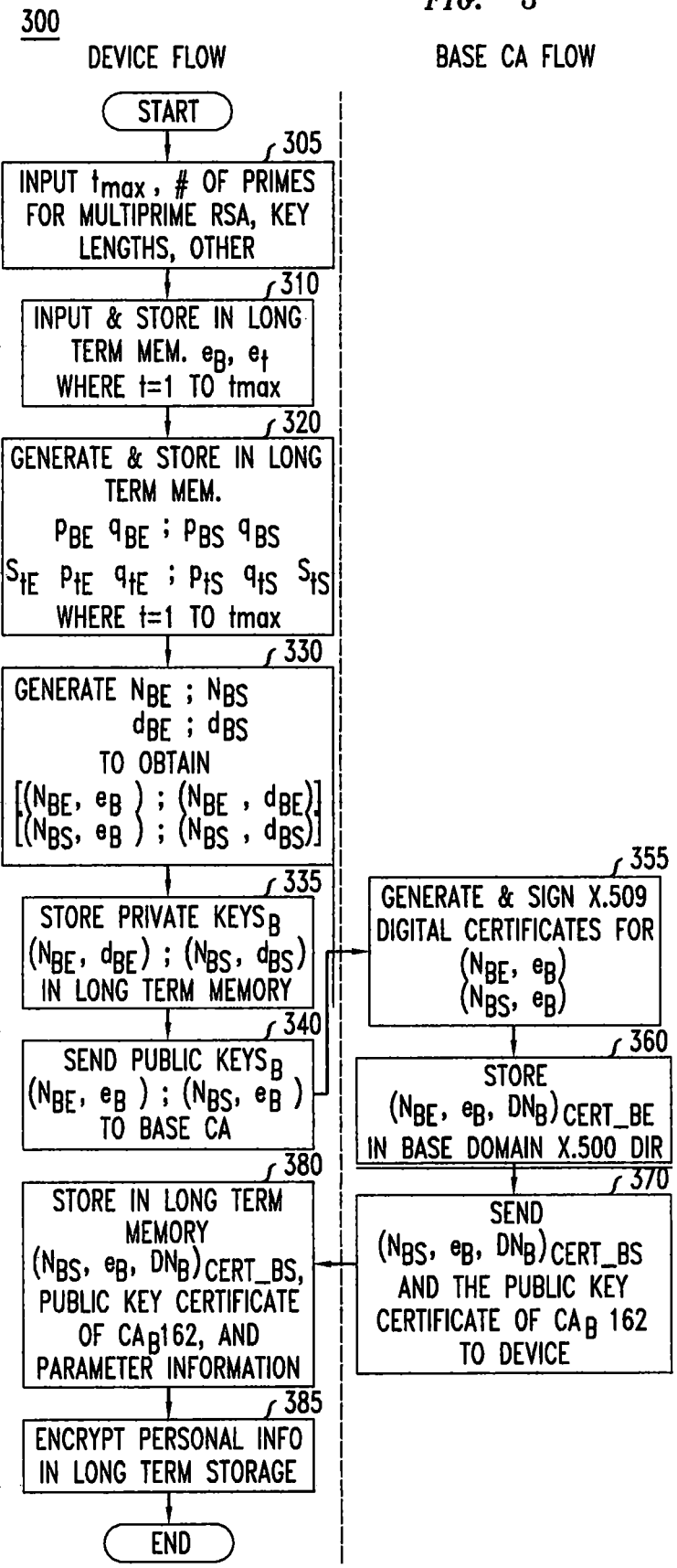
FIG. 3 illustrates an example flow diagram of device initialization according to an embodiment of the present invention.

FIG. 3 illustrates an exemplary flow diagram 300 of the initialization of an exemplary temporal key generation device, such as device 200, according to an embodiment of the present invention. As shown is an example process flow between the temporal key generation device 200 and a $CA_B$ 162 to initialize the temporal key generation device 200. For purposes of clarity, the following symbol definitions and groupings are provided including information that may be stored in long term memory 202 during Flow 300 initialization:

Persona Long Term Storage Information 400 includes at least one Base CA Domain Key Generation Group 405 and associated $t_{max}$ CA Domain Key Generation Groups 410.

Each Base CA Domain Key Generation Group 405 includes:
  $e_B$=>e for Base CA Domain 160
  $p_{BE}$, $q_{BE}$=>primes to generate a Base CA Domain 160 encryption key pair
  $d_{BE}$=>d for a Base CA Domain 160 private encryption key
  $N_{BE}$=>N used for a Base CA Domain 160 encryption key pair
  $p_{BS}$, $q_{BS}$=>primes to generate a Base CA Domain 160 signature key pair
  $d_{BD}$=>d for a Base CA Domain 160 private signature key
  $N_{BS}$=>N used for a Base CA Domain 160 signature key pair
  $(N_{BS}, e_B, DN_B)_{CERT\_BS}$=> the persona's digital certificate for the Base CA Domain signature public key which includes a unique identifier, in this example the unique identifier is a distinguished name for the base CA Domain ($DN_B$);
Public Key Certificate of the Base CA, $CA_B$ 162; and
Parameter information which includes:
  Device ID;
  Number of primes to use for multi-prime RSA;
  $t_{max}$=> the maximum number of CA Domain Key Generation Groups;
  Desired Base CA Domain key length; and
  Other information known in the art such as algorithms for key exchange, digital signatures, encryption, decryption, hashing and key generation.
Each CA Domain Key Generation Group t includes:
  $e_t$=>e of CA Domain Key Generation Group t used to generate CA Domain key pairs;
  $p_{tE}$, $q_{tE}$=>primes of CA Domain Key Generation Group t used to generate a CA Domain encryption key pair;
  $S_{tE}$=>Secret of CA Domain Key Generation Group t used to validate a CA Domain encryption key pair;
  $P_{tS}$, $q_{tS}$=>primes of CA Domain Key Generation Group t used to generate a CA Domain signature key pair; and
  $S_{tS}$=>Secret of CA Domain Key Generation Group t used to validate a CA Domain signature key pair;
where t=1 to $t_{max}$, The present invention may implement multi-prime RSA using three or more prime numbers. In an exemplary embodiment of the invention, where multi-prime RSA is used to generate keys for entities within the CA Domain$_n$, at least two of the prime numbers may be stored in the device 200. In an embodiment, where the Base CA Domain uses x primes of z bit length each to generate keys and the CA Domain$_n$ uses x+y primes, y>=1, of z' bit length each to generate keys, z' should equal z and at least x primes of the CA Domain$_n$ may be stored in device 200. For example, if devices within the Base CA Domain use two primes, p and q, to generate 1024 bit keys, primes p and q are 512 bits each or z=512. As such, if a device within CA Domaine uses three primes, p, q, and r, to generate keys, each of these prime numbers should be 512 bits and at least two of these primes, for example p and q, may be stored on device 200. Using such an approach, the size of Domain$_n$ prime numbers may be calculated. Other variations can be applied, but the risks versus benefits as expressed in Hinek, *On the Security of Multi-prime RSA*, Jun. 13, 2006 should be considered.

In the exemplary embodiment depicted in FIG. 3, device 200 may be initialized to include persona long term storage information 400. FIG. 3 shows a process flow 300 between device 200 and the Certification Authority$_B$ ($CA_B$) 162 of the Base CA Domain 160. Transfers between the two may pass through the interface 216 of device 200. During the initialization of flow 300, persona long term storage information 400 may be input, generated, or received and stored in long term memory 202. During this process of flow 300, information may be temporarily stored in short term memory 206. In such a case, the temporarily stored information of flow 300 may be erased when such storage may be no longer needed, wanted, or when Flow 300 is complete. If the short term memory 206 is volatile memory, the short term memory 206 may be erased should power be removed from it.

In step 305, the number of primes to use for multi-prime RSA, $t_{max}$, the desired Base CA Domain key length and other parameters may be input into the device 200. For purposes of this example embodiment, the number of primes to use for multi-prime RSA is three (p, q and r).

In step 310, $e_B$ and $e_t$ (where t=1 to $t_{max}$) are input into the temporal key generation device 200 through the interface 216 and stored in the long term memory 202. The inputting can be done via manual user input through a graphical user interface (GUI) on computer 111 that interfaces with the device 200. Alternatively, the device 200 may be configured and operable to generate $e_B$ and $e_t$ (where t=1 to $t_{max}$) using the cryptoprocessor 210 and store them in the long term memory 202.

In step 320, the cryptoprocessor 210 may be operable to generate primes, $p_B$ and $q_B$, used to generate Base CA Domain key pairs and the primes, $p_t$ and $q_t$, used to generate CA Domain$_n$ key pairs which may be generated with respect to $e_B$ and $e_t$, respectively, where t=1 to $t_{max}$. The so generated primes may be stored in long term memory 202. Additionally, the random number generator 212 may be operable to randomly generate secrets, $S_{tE}$ and $S_{tS}$, where t=1 to $t_{max}$. In one embodiment, a bit length for each Secret may be the same or greater bit length as $N_{BE}$ or $N_{BS}$.

In step 330, cryptoprocessor 210 may be operable to (a) multiply $p_{BE}$ and $q_{BE}$ to obtain $N_{BE}$, and (b) multiply $p_{BS}$ and $q_{BS}$ to obtain $N_{BS}$. In an embodiment $d_{BE}$ and $d_{BS}$ may be generated by the crypto processor 210. As a result, an encryption key pair for the Base CA Domain [($N_{BE}$, $e_B$); ($N_{BE}$, $d_{BE}$)] may be obtained. Moreover, a signature key pair for the Base CA Domain [($N_{BS}$, $e_B$); ($N_{BS}$, $d_{BS}$)] may be obtained.

In step 335, long term memory 202 may be operable to store private keys, ($N_{BE}$, $d_{BE}$) and ($N_{BS}$, $d_{BS}$).

In step 340, Public keys, ($N_{BE}$, $e_B$) and ($N_{BS}$, $e_B$), may be sent to Base CA ($CA_B$) 162 through the Interface 216.

In step 355, Base CA ($CA_B$) 162 may be operable to take the output of step 340 and generate and sign respective digital certificates using the private key of Base CA ($CA_B$) 162. This step, with sufficient identity proofing, binds a persona's distinguished name ($DN_B$) for the Base CA Domain 160 to the public keys, ($N_{BE}$, $e_B$) and ($N_{Bs}$, $e_B$) and to their respective private keys stored in Long Term Memory 202. A persona can represent a human, machine, role, or group. The resultant digital certificates may be the persona's digital certificate ($N_{BE}$, $e_B$, $DN_B$)$_{CERT\_BE}$ for the Base CA Domain encryption key pair and the persona's digital certificate ($N_{BS}$, $e_B$, $DN_B$)$_{CERT\_BS}$ for the Base CA Domain signature key pair. The example digital certificate notation provided throughout this disclosure is meant to reflect an X.509 digital certificate with only a subset of variables highlighted, e.g., (N, e, DN)$_{CERT\_B}$, for illustrative purposes.

In step 360, one of the resultant outputs of step 355, ($N_{BE}$, $e_B$, $DN_B$)$_{CERT\_BE}$, is stored in the Base CA Domain database (DB$_B$). DB$_B$ being an X.500 directory.

In step 370, one of the resultant outputs of step 355, ($N_{BS}$, $e_B$, $DN_B$)$_{CERT\_BS}$, may be sent to the device 200. Moreover, the pubic key certificate of the Base CA 162 may also be sent to the device 200.

In step 380, ($N_{BS}$, $e_B$, $DN_B$)$_{CERT\_BS}$ may be received by the device 200 through the Interface 216 and stored in Long Term Memory 202. Parameter information may be also stored in Long Term Memory 202. The public key certificate of the Base CA 162 may also be received by the device 200 and stored in Long Term Memory 202.

In step 385, the Long Term Storage Information for the persona may be encrypted.

Initialization of the device 200 with Persona Long Term Storage Information is at its end upon the completion of step 385. Other initialization activities, as may be known in the art for initializing tokens such as a FIPS 201-2 personal identity verification card (PIV Card), may also occur for the device 200, such as establishing logon information and encrypting certain information like the Persona Long Term Storage Information.

Figure 4:
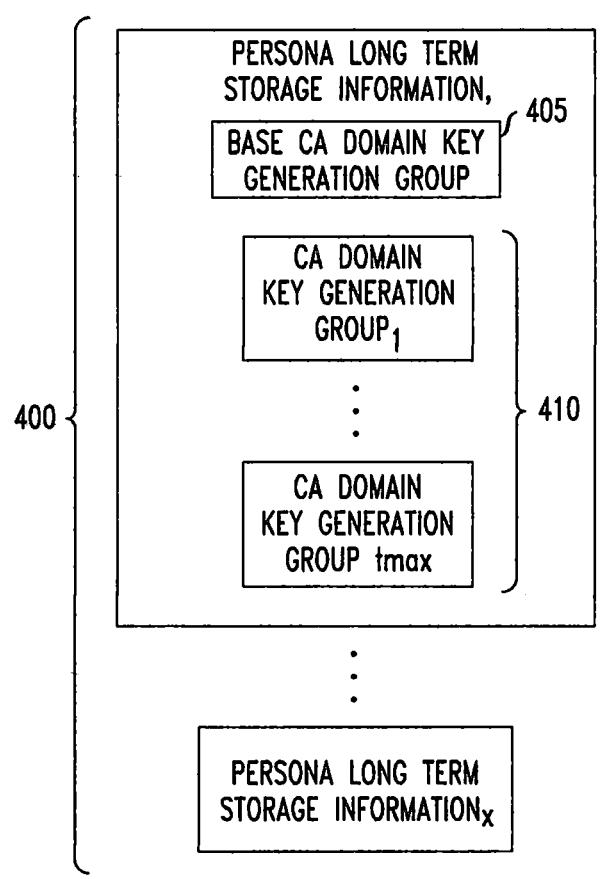
FIG. 4 illustrates a logical diagram showing an example logical storage layout of key generation information stored on the device according to an embodiment of the present invention.

FIG. 4 illustrates a logical diagram showing an exemplary logical storage layout of key generation information stored on the temporal key generation device 200 according to an embodiment of the present invention. As shown in FIG. 4, a plurality of Persona Long Term Storage Information 400 can be stored on the Device 200. Each of the Persona Long Term Storage Information 400 includes at least one Base CA Domain Key Generation Group 405 and associated $t_{max}$ CA Domain Key Generation Groups 410.

Figure 5:
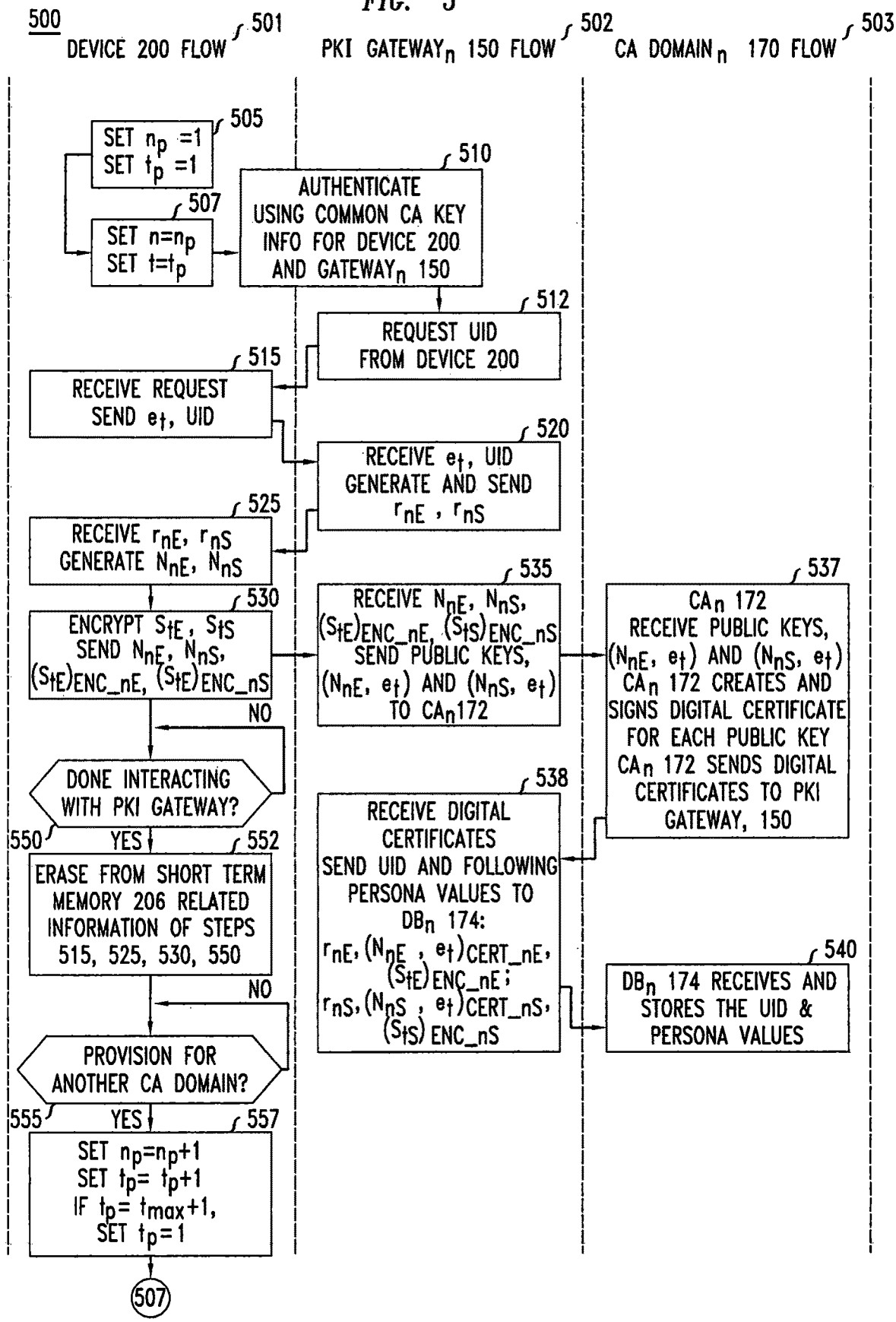
FIG. 5 illustrates a flow diagram showing an example provisioning of a device to a CA Domain according to an embodiment of the present invention.

FIG. 5 illustrates a flow diagram 500 showing an exemplary provisioning of a temporal key generation device to a CA Domain$_n$ according to an embodiment of the present invention. An advantage of the exemplary embodiment is that while the number of CA Domain Key Generation Groups may be limited to $t_{max}$ during an initialization flow 300, the number of CA Domain provisionings may not be so limited. In the example of FIG. 5, three interacting flows are shown: Device 200 Flow 501, PKI Gateway$_n$ 150 Flow 502, and CA Domain$_n$ 170 Flow 503. Transfers to and from Device 200 pass through interface 216. Transfers to and from PKI Gateways 150 pass through interface 266. Information generated, sent or received by Device 200 as part of flow 501 may be predominately, temporarily stored in Short Term Memory 206. In the present embodiment, Short Term Memory 206 can be volatile memory such that should power be removed from Device 200, information stored in Short Term Memory 206 may be no longer retained. This helps ensure that key information associating the UID with CA Domain$_n$ 170 no longer exists on Device 200 when power is removed.

In step 505, a CA Domain provisioning index, $n_p$, may be set to 1. A CA Domain Key Generation Group provisioning index, $t_p$, may be set to 1, In step 507, a CA Domain index, n, may be set to $n_p$. A CA Domain Key Generation Group index, t, may be set to $t_p$.

In step 510, an authentication occurs between Device 200 and Gateway$_n$ 150 using at least one of their certificates signed by a CA of a common CA Domain. If the common CA Domain is the Base CA Domain 160, then at least one digital certificate signed by the Base CA Domain CA$_B$ 162 may be used. If the common CA Domain is the CA Domain$_{n-1}$, then at least one digital certificate signed by the CA Domain$_{n-1}$ CA$_{n-1}$ may be used.

In step 512, PKI Gateway$_n$ 150 sends a request for a unique identifier (UID) to Device 200. The UID may be used by the PKI Gateway$_n$ 150 and DB$_n$ 174 as an index for associated persona values. There may be several identifiers that can be used as a UID. A first means may be to use the persona's Distinguished Name (DN$_B$) that may be included in the ($N_{BS}$, $e_B$, $DN_B$)$_{CERT\_BS}$ stored in Long Term Memory 202 of the Device 200. A second means may be to use a Device ID that may be available in Device 200. The second means may be problematic if the device 200 is lost or destroyed. The first and second means, however, work with traversing gateways via pivoting as described in FIG. 7. That is, the Device 700 connects directly to a PKI Gateway$_n$ for both provisioning and subsequent CA domain connection. The first and second means also work with chaining as described in FIG. 8 where the Device 800 connects through a path of PKI Gateways$_n$ to get to an end CA Domain$_n$ 874. Using the first or second means during provisioning, the Device 800 can obtain the appropriate key generation information each time the Device 800 connects to the end CA Domain$_n$ 874, regardless of the PKI Gateway$_n$ path taken.

In a third means, if the Device 200 is trying to go from CA Domain$_{n-1}$ to CA Domain$_n$, the $DN_{(n-1)S}$ may be used as the UID. Depending on implementation, however, if the $DN_{(n-1)S}$ may be used, the persona may need to go through CA Domain$_{n-1}$ 170 each time subsequent to provisioning in order to take advantage of the keying information generated during the provisioning. Other values known in the art for a UID may also be used. For the example of FIG. 5, the persona's distinguished name for the Base CA Domain 160 (DN$_B$) may be used.

In step 515, the Device 200 receives the request of step 512 and sends $e_t$ and a UID to PKI Gateway$_n$ 150.

In step 520, PKI Gateway$_n$ 150 receives the output of step 515 and generates $r_{nE}$ and $r_{nS}$ with respect to $e_t$ using Crypto Processor 260 and Random Number Generator 262. PKI Gateway$_n$ 150 additionally sends $r_{nE}$ and $r_{nS}$ to Device 200.

In step 525, Device 200 receives the output of step 520 and generates $N_{nE}$ by multiplying $p_{tE}$, $q_{tE}$, and $r_{nE}$ and generates $N_{nS}$ by multiplying $p_{tS}$, $q_{tS}$, and $r_{nS}$.

In step 530, the Device 200 encrypts $S_{tE}$ using public key ($N_{nE}$, $e_t$) to obtain ($S_{tE}$)$_{ENC\_nE}$ and encrypts $S_{tS}$ using public key ($N_{nS}$, $e_t$) to obtain ($S_{tS}$)$_{ENC\_nS}$. Device 200 then sends $N_{nE}$, $N_{nS}$, ($S_{tE}$)$_{ENC\_nE}$, and ($S_{tS}$)$_{ENC\_nS}$ to PKI Gateway$_n$ 150. To further help prevent exposure of $S_{tE}$ and $S_{tS}$, these values could be further obfuscated prior to encryption and sending. As an alternative to sending ($S_{tE}$)$_{ENC\_nE}$ and ($S_{tS}$)$_{ENC\_nS}$, $S_{tE}$ and $S_{tS}$ instead could be added to $r_{nB}$ and $r_{nS}$, the sums subsequently hashed and the hashed values encrypted using public key ($N_{nE}$, $e_t$) to obtain (HASH($S_{tE}$+$r_{nE}$))$_{ENc\_nE}$ and using public key ($N_{nS}$, $e_t$) to obtain (HASH ($S_{tS}$+$r_{nS}$))$_{ENC\_nS}$. As such, (HASH($S_{tE}$+$r_{nE}$))$_{ENC\_nE}$ and (HASH($S_{tS}$+$r_{nS}$))$_{ENC\_nS}$ could then be handled, throughout, instead of ($S_{tE}$)$_{ENC\_nE}$ and ($S_{tS}$)$_{ENC\_nS}$.

In step 535, the PKI Gateway$_n$ 150 receives the output of step 530 and sends public keys, ($N_{nE}$, $e_t$) and ($N_{nS}$, $e_t$) to CA$_n$ 172.

In step 537, CA$_n$ 172 receives the public keys of step 535, creates and signs a digital certificate for each public key and sends the digital certificates to the PKI Gateway$_n$ 150.

In step 538, the PKI Gateway$_n$ 150 receives the output of step 537 from CA$_n$ 172 and sends the UID and following persona values to DB$_n$ 174:

$r_{nE}$, ($N_{nE}$, $e_t$)$_{CERT\_nE}$, ($S_{tE}$)$_{ENC\_nE}$; and $r_{nS}$, ($N_{nS}$, $e_t$)$_{CERT\_nS}$, ($S_{tS}$)$_{ENC\_nS}$.

In step 540, $DB_n$ 174 receives and stores the UID and persona values.

In step 550, the Device 200 determines if it is done interacting with PKI Gateway$_n$ 150. If yes, Device 200 goes to step 552. If not it goes to beginning of step 550.

In step 552, Device 200 erases from memory, without erasing Persona Long Term Storage Information 400 stored in Long Term Memory 202, information on Device 200 involved in the present cycle of process flow 501. This step helps ensure that key information associating the UID with CA Domain$_n$ 170 no longer exists on Device 200.

In step 555, Device 200 determines if it is to provision for another CA Domain$_{(n+1)}$ 170. If yes, then Device 200 advances to step 557, else starts back at step 555.

In step 557, Device 200 sets $n_p=n_p+1$ and $t_p=t_p+1$. If $t_p=t_{max}+1$, set $t_p=1$ and go to step 507. Alternatively, t may be selected within the range, 1 to $t_{max}$, by a random means or by a means of another algorithm. Changing the t causes a new CA Domain Key Generation Group 410 to be selected. This helps prevent collisions in situations where device 200 receives a newly generated $r_n$ for a CA Domain Key Generation Group that has already received the same $r_n$ for another CA Domain 170. Another means for reducing the risk of collision consistent with the present invention and multi-prime RSA may be for the PKI Gateway$_n$ 150 to randomly generate two or more prime numbers for use in the key generation process of a particular key pair. For example, the PKI Gateway$_n$ 150 could generate a prime value, $s_{nS}$, in addition to $r_{nS}$ for use in generating a signature key pair of a particular CA Domain Key Generation Group 410.

FIGS. 6A and 6B illustrate a flow diagram 600 showing an exemplary key generation according to an embodiment of the present invention. In the example of FIG. 6, three interacting flows are shown: Device 200 Flow 601, PKI Gateway$_n$ 150 Flow 602 and CA Domain$_n$ 170 Flow 603. Transfers to and from Device 200 pass through interface 216. Transfers to and from PKI Gateway$_n$ 150 pass through interface 266. Information generated, sent or received by Device 200 as part of flow 601 may be predominately, temporarily stored in Short Term Memory 206. In the present embodiment, Short Term Memory 206 can be volatile memory such that should power be removed from Device 200, information stored in Short Term Memory 206 may be no longer retained. This helps ensure that key information associating the UID with CA Domain$_n$, 170 no longer exists on Device 200 when power is removed.

In step 605, a CA Domain connection index, $n_c$, may be set to 1.

In step 607, a CA Domain index, n, may be set to $n_c$.

In step 610, an authentication occurs between Device 200 and Gateway$_n$ 150 using at least one of their certificates signed by a CA of a common CA Domain. If the common CA Domain is the Base CA Domain 160, then at least one digital certificate signed by the Base CA Domain $CA_B$ 162 may be used. If the common CA Domain is the CA Domain$_{n-1}$, then at least one digital certificate signed by the CA Domain$_{n-1}$ $CA_{n-1}$ may be used.

In step 612, PKI Gateway$_n$ 150 sends a request for a unique identifier (UID) to Device 200.

In step 615, Device 200 receives the request of step 612 and sends a UID to PKI Gateway$_n$ 150. For this example, the UID may be the persona's distinguished name for the Base CA Domain 160 ($DN_B$).

In step 620, PKI Gateway$_n$ 150 receives the output of step 615 and sends the UID to $DB_n$ 174 and requests the persona values stored in step 540.

In step 622, $DB_n$ 174 receives the UID and request. $DB_n$ 174 then fetches the persona values using the UID and sends them to Gateway$_n$ 150 along with the public key certificate of the $CA_n$ 172.

In step 624, Gateway$_n$ 150 receives the persona values and public key certificate of the $CA_n$ 172 and sends them to Device 200.

In step 625, Device 200 receives into Short Term Memory 206 the persona values and public key certificate of $CA_n$ 172. Device 200 also finds the corresponding CA Domain$_n$ Key Generation Group 410 where $r_{nE}$ and $r_{nS}$, when multiplied with the corresponding $p_{tE}$, $q_{tE}$ and $p_{tS}$, $q_{tS}$, respectively, matches the received $N_{nE}$ and $N_{nS}$ values, respectively. This can be accomplished by stepping through or randomly selecting the CA Domain$_n$ Key Generation Groups 410 located on Device 200 and performing a comparison.

In step 625, if the Group 410 cannot be found, flow 601 skips to step 652. If the Group 410 is found, flow 601 goes to step 627.

In step 627, Device 200 uses Group 410 information and received persona value information to calculate $d_{nE}$ and $d_{nS}$. The calculation method being known in the art and using Crypto Processor 210. Device 200 then stores $d_{nE}$ and $d_{nS}$ in Short Term Memory 206.

In step 630, Device 200 uses private key ($d_{nE}$, $N_{nE}$) to decrypt $(S_{tE})_{ENC\_nE}$ and private key ($d_{nS}$, $N_{nS}$) to decrypt $(S_{tS})_{ENC\_nS}$. If $(HASH(S_{tE}+r_{sE}))_{ENC\_nE}$ and $(HASH(S_{tS}+r_{nS}))_{ENC\_nS}$ were used in step 530 instead of $(S_{tE})_{ENC\_nE}$ and $(S_{tS})_{ENC\_nS}$, private key ($d_{nE}$, $N_{nE}$) may be used to decrypt $(HASH(S_{tE}+r_{nE}))_{ENC\_nE}$ and private key ($d_{nS}$, $N_{nS}$) may be used to decrypt $(HASH(S_{tS}+r_{nS}))_{ENC\_nS}$.

In step 635, Device 200 determines if the decrypted values of $(S_{tE})_{ENC\_nE}$ and $(S_{tS})_{ENC\_nS}$ match the corresponding $S_{tE}$ and $S_{tS}$ of the corresponding CA Domain Key Generation Group 410 found in step 625. If $(HASH(S_{tE}+r_{nE}))_{ENC\_nE}$ and $(HASH(S_{tS}+r_{nS}))_{ENC\_nS}$ were used in step 530 instead of $(S_{tE})_{ENC\_nE}$ and $(S_{tS})_{ENC\_nS}$, Device 200 determines if the decrypted $HASH(S_{tE}+r_{nE})$ and $HASH(S_{tS}+r_{nS})$ match $HASH(S_{tE'}+r_{nE})$ and $HASH(S_{tS'}+r_{nS})$, respectively; where $S_{tE'}$ and $S_{tS'}$ are $S_{tE}$ and $S_{tS}$, respectively, of the corresponding CA Domain Key Generation Group 410 found in step 625. Step 635 helps ensure that Gateway$_n$ 150 or other entity has not performed a "person-in-the-middle" attack to comprise values exchanged. If the values do not match, flow 601 advances to step 652. If the values do match, flow 601 advances to step 640. In this step, device 200 may subsequently send information to PKI Gateway$_n$ 150 that it has appropriate CA Domain$_n$ 170 key information.

In step 640, Device 200 uses the key information received and generated in flow 601 to communicate in the CA Domain$_n$ 170.

In step 650, Device 200 determines if it is done interacting with CA Domain 170. If it is, then flow 601 advances to step 652. If it is not done, flow 601 goes back to step 650.

In step 652, Device 200 erases from Short Term Memory 206 related information of steps 615, 625, 626, 627, 630, 635 and 650. This step helps ensure that key information associating the UID with CA Domains 170 no longer exists on Device 200.

As an alternative to this example of finding the CA Domain Key Generation Group 410 as described in step 625, the t generated in the provisioning flow 501 could be stored in the $DB_n$ 174 entry associated with the UID and retrieved in flow 601 to find the Group 410.

In step 655, if Device 200 needs to connect to CA Domain$_{(n+1)}$, then flow advances to step 657.

In step 655, if Device 200 does not need to connect to CA Domain$_{(n+1)}$, then flow ends.

In step 657, set nc=nc+1 then goto step 607.

Figure 7:
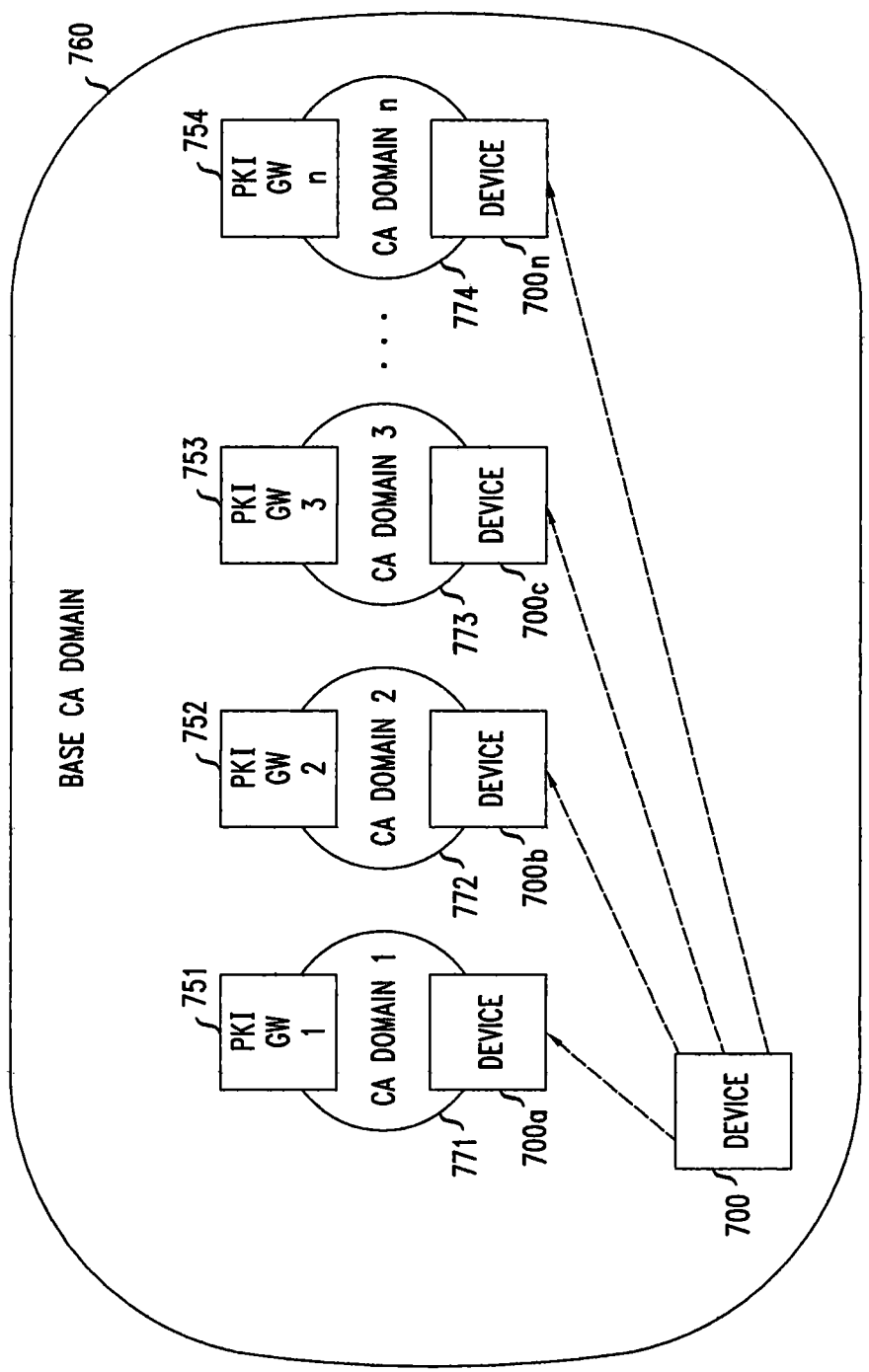
FIG. 7 illustrates a logical diagram showing example logical relationships of CA domains, devices and PKI gateways in a pivot relation according to an embodiment of the present invention.

FIG. 7 illustrates a logical diagram showing exemplary logical relationships of CA domains, devices and PKI gateways in a pivot relation according to an embodiment of the present invention. As shown, Base CA Domain 760 has the same configuration as Base CA Domain 160; CA domains 771, 772, 773 and 774 have the same configuration as CA Domains 170; PKI Gateways 751, 752, 753, and 754 have the same configuration as PKI Gateway 250; Device 700 has the same configuration as Device 200; and Devices 700a, 700b, 700c, and 700d may be the same as Device 700 except in different instances of time in relation to CA domains 771, 772, 773 and 774. In an aspect of the invention, all elements of FIG. 7 have a relationship with Base CA Domain 760. In a pivot scenario, the Device 700 provisions with any of the CA domains 771, 772, 773 and 774 directly using PKI Gateways 751, 752, 753, and 754, respectively, without going through an intermediary PKI Gateway or CA Domain. This may be also the case for subsequent connections after provisioning. In an aspect of the invention, the Device 700 associates with one CA Domain at a time. In another aspect of the invention, the Device 700 may be associated with more than one CA Domain at a time.

Figure 8:
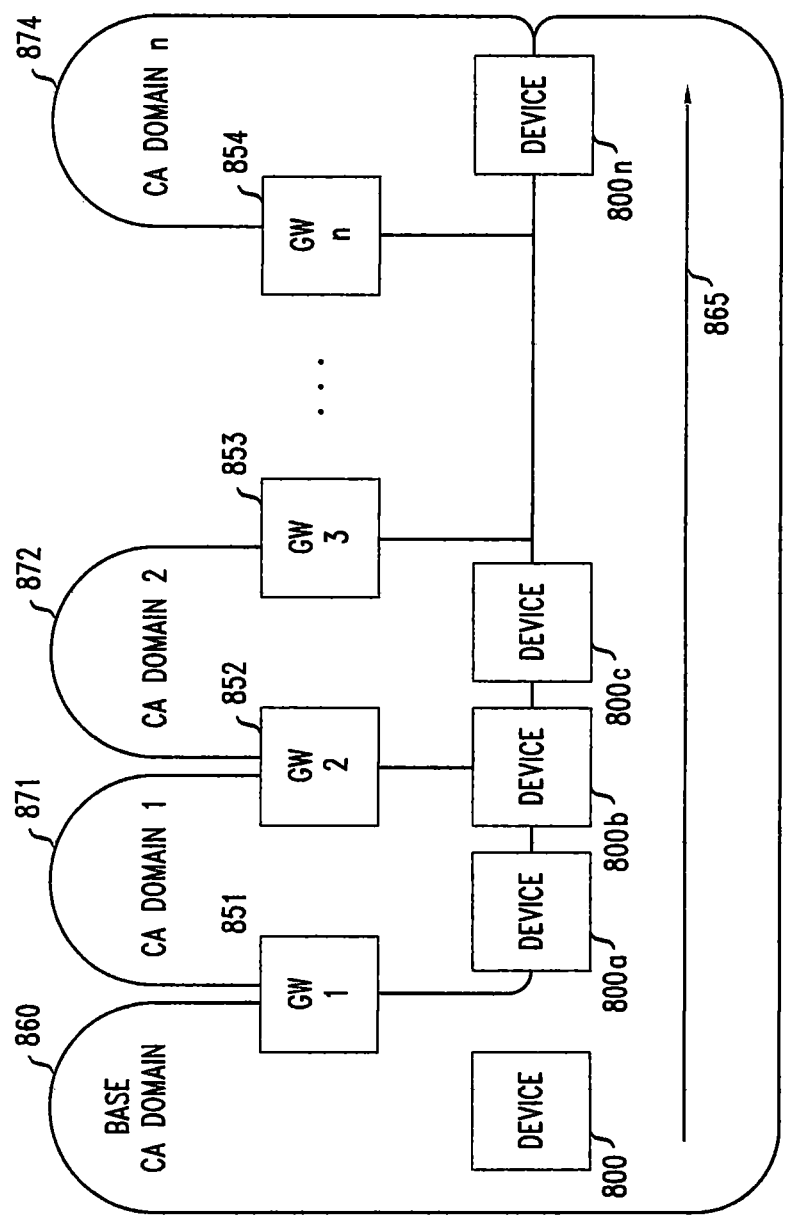
FIG. 8 illustrates a logical diagram showing example logical relationships of CA domains, devices and PKI gateways in a chaining relation according to an embodiment of the present invention.

FIG. 8 illustrates a logical diagram showing exemplary logical relationships of CA domains, devices and PKI gateways in a chaining relation according to an embodiment of the present invention. As shown, Base CA Domain 860 has the same configuration as Base CA Domain 160; CA domains 871, 872, and 874 have the same configuration as CA Domains 170; PKI Gateways 851, 852, 853, and 854 have the same configuration as PKI Gateway 250; Device 800 has the same configuration as Device 200; and Devices 800a, 800b, 800c, and 800d may be the same as Device 800 except in different instances of time 865 in relation to CA domains 871, 872, and 874. In a chaining scenario, the Device 800 provisions with any of the CA domains 871, 872, and 874, respectively. This may be also the case for subsequent connections after provisioning. In an aspect of the present invention, the Device 800 associates with CA domains 871 and 872 using PKI Gateways 851 and 852 until it gets to PKI Gateway 854 with which it provisions to associate with CA Domain 874. In chaining, the Device 800 will be associated with at least three domains when going from one CA Domain to another. For example, Device 800b may be associated with the Base CA Domain 860, CA Domain 871, and CA Domain 872. When provisioning is complete, there may be no further need to be connected to CA Domain 871 at which time, the short term information related to CA Domain 871 may be erased from the device so that it may be only affiliated with the Base CA Domain 860 and CA Domain 872 as shown by Device 800c. In another aspect of the invention, the Device 800 may be capable of maintaining associations to each CA Domain 871 and 872 on Device 800 as it makes its way to CA Domain 874.

The invention being thus described herein, it should be understood that the same may be varied in many ways. Such variations are not to be regarded as a departure from the spirit and scope of the invention, and all such variations are intended to be included within the scope of the following claims.

What is claimed:

1. A key generation device comprising:
    an interface;
    a first memory operable to store a first key generation numeric value; and
    a processor operable to:
        authenticate, through the interface, with a gateway as a function of using a first domain credential, the first domain credential belonging to a first domain; and
        generate, as a function of using the first key generation numeric value and a key generation numeric value received from the gateway, a second domain private key that is cryptographically bound to a second domain public key, the second domain public key having been generated and stored prior to the authentication, the second domain private key and the second domain public key belonging to a second domain.

2. The key generation device of claim 1, further comprising:
    a second memory operable to store the second domain private key and further operable to perform at least one of the following:
        erase the second domain private key when the key generation device is disconnected from the second domain or done interacting with the second domain; and
        no longer store the second domain private key when the second memory no longer receives power.

3. The key generation device of claim 1, wherein the processor is further operable to:
    generate the second domain private key as a function of using the first key generation numeric value, upon a subsequent receiving of the key generation numeric value.

4. The key generation device of claim 1, wherein the second domain private key is cryptographically bound to the second domain public key by an asymmetric cryptography binding.

5. The key generation device of claim 1, wherein the second domain public key is a certified public key certified by a second domain certificate authority of the second domain.

6. The key generation device of claim 1, wherein the first key generation numeric value is for signature private key generation.

7. The key generation device of claim 1, wherein the received key generation numeric value is for encryption private key generation.

8. A non-transitory, machine readable medium having computer-executable instructions stored thereon that, when executed by at least one hardware processor, causes the at least one hardware processor to perform a plurality of operations, the operations comprising:
    authenticating with a gateway as a function of using a first domain credential, the first domain credential belonging to a first domain; and
    generating, as a function of using a first key generation numeric value and a key generation numeric value received from the gateway, a second domain private key that is cryptographically bound to a second domain public key, the second domain public key having been generated and stored prior to the authenticating, the second domain private key and the second domain public key belonging to a second domain.

9. The non-transitory, machine readable medium of claim 8, wherein the operations further comprise:
    storing the second domain private key in a memory;
    erasing the second domain private key when the at least one hardware processor is done interacting with the second domain; and no longer storing the second domain private key when the memory no longer receives power.

10. The non-transitory, machine readable medium of claim 8, wherein the operations further comprise:
generating the second domain private key as a function of using the first key generation numeric value, upon a subsequent receiving of the key generation numeric value.

11. The non-transitory, machine readable medium of claim 8, wherein the second domain private key is cryptographically bound to the second domain public key by an asymmetric cryptography binding.

12. The non-transitory, machine readable medium of claim 8, wherein the second domain public key is a certified public key certified by a second domain certificate authority of the second domain.

13. The non-transitory, machine readable medium of claim 8, wherein the first key generation numeric value is for signature private key generation.

14. The non-transitory, machine readable medium of claim 8, wherein the received key generation numeric value is for encryption private key generation.

15. A method comprising:
authenticating with a gateway as a function of using a first domain credential, the first domain credential belonging to a first domain; and
generating, as a function of using a first key generation numeric value and a key generation numeric value received from the gateway, a second domain private key that is cryptographically bound to a second domain public key, the second domain public key having been generated and stored prior to the authenticating, the second domain private key and the second domain public key belonging to a second domain.

16. The method of claim 15, further comprising:
storing the second domain private key in a memory;
erasing the second domain private key when a processor is done interacting with the second domain; and
no longer storing the second domain private key when the memory no longer receives power.

17. The method of claim 15, further comprising:
generating the second domain private key as a function of using the first key generation numeric value, upon a subsequent receiving of the key generation numeric value.

18. The method of claim 15, wherein the second domain private key is cryptographically bound to the second domain public key by an asymmetric cryptography binding.

19. The method of claim 15, wherein the second domain public key is a certified public key certified by a second domain certificate authority of the second domain.

20. The method of claim 15, wherein the first key generation numeric value is for signature private key generation.

21. The method of claim 15, wherein the received key generation numeric value is for encryption private key generation.

* * * * *